M. W. HINKLE.
Adding-Machine.

No. 200,911. Patented March 5, 1878.

WITNESSES:
Francis McArdle.
C. Sedgwick

INVENTOR:
M. W. Hinkle
BY Munn & Co
ATTORNEYS.

UNITED STATES PATENT OFFICE.

MILTON W. HINKLE, OF MEMPHIS, TENNESSEE.

IMPROVEMENT IN ADDING-MACHINES.

Specification forming part of Letters Patent No. 200,911, dated March 5, 1878; application filed January 11, 1878.

*To all whom it may concern:*

Figure 1:
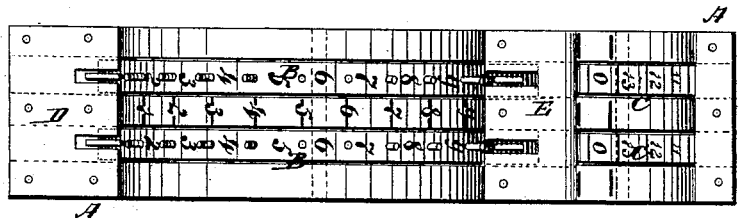
Figure 2:
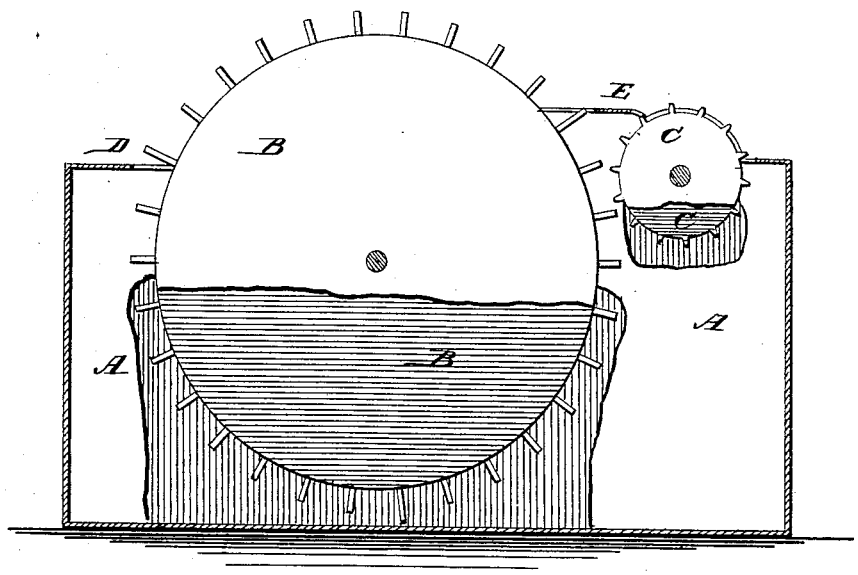

Be it known that I, MILTON W. HINKLE, of Memphis, county of Shelby, and State of Tennessee, have invented a new and Improved Adding-Machine, of which the following is a specification:

Figure 1 is a top view of one of my improved machines. Fig. 2 is a section of the same.

Similar letters of reference indicate corresponding parts.

The object of this invention is to furnish an improved machine for use in adding columns of figures and in keeping the tally of things to be counted, which shall be simple in construction and accurate in operation, and which may be operated very rapidly.

The invention consists in an adding-machine formed by the combination of one or more pairs of wheels, provided with numbered pins and teeth, with the box, provided with index-numbers between the larger wheels, and with the notched plates, as hereinafter described.

A is a box or case, in the forward part of which are pivoted one or more wheels, B, placed parallel with each other, and at a distance apart about equal to the width of the said wheels B. The wheels B are designed to be made about three inches in diameter, and to their faces are attached, at equal distances apart, thirty radial pins, which pins are numbered from 1 to 0, and each tenth or zero pin is made longer than the others. The part of the top of the box A between the wheels B is arched to correspond with the top of the wheels, and is numbered from 1 to 9, the numbers, called by me "index-numbers," being placed at the same distance apart as the pins of the said wheels. In the rear part of the box A, in line with the wheels B, are pivoted a set of smaller wheels, C, upon the faces of which are formed fourteen teeth, which are numbered from 0 to 13. The wheels C are placed such a distance from the wheels B that each long tooth of the wheels B will strike a tooth of the wheels C and turn the said wheels through the space of one tooth. The top of the box A, in front of the wheels B, is covered by a plate, D, called by me a "finger-plate," and which is notched for the passage of the pins of the wheels B. The top of the box A, between the wheels B C, is covered by a plate, E, which is notched for the passage of the pins of the wheels B. Any desired number of pairs of wheels B C may be used.

In using the machine, each column of figures is added with its own pair of wheels B C, the operator placing his finger upon the pin of the wheel B opposite the index-number representing the figure to be added, and turning the said wheel until his finger strikes the finger-plate, all the wheels being adjusted before beginning with their zeros in the first space above the plates D E. After the columns have all been added, the numbers upon the small wheels e, in the first space above the plate E, are transferred or added to the next large wheel, or to the next two large wheels when the number consists of two figures. The numbers upon the first space above the plate D upon the large wheels B and the number upon the first space above the plate E of the last small wheel represent the result.

Having thus fully described my invention, I claim as new and desire to secure by Letters Patent—

An adding-machine formed by the combination of one or more pairs of wheels, B C, provided with the numbered pins and teeth, with the box A, provided with the index-numbers between the said wheels B, and with the notched plates D E, substantially as herein shown and described.

MILTON WASHINGTON HINKLE.

Witnesses:
WALTER W. HARVEY,
B. P. DUGAN.